United States Patent [19]

Dozier

[11] 4,452,347

[45] Jun. 5, 1984

[54] BRAKE SPIDER

[75] Inventor: Leonard C. Dozier, Birmingham, Mich.

[73] Assignee: Rockwell International Corporation, Pittsburgh, Pa.

[21] Appl. No.: 440,769

[22] Filed: Nov. 10, 1982

Related U.S. Application Data

[63] Continuation of Ser. No. 259,262, Apr. 30, 1981, abandoned.

[51] Int. Cl.³ ............................................. F16D 51/22
[52] U.S. Cl. ................................. 188/330; 188/18 R; 188/205 R; 188/341
[58] Field of Search ............ 188/18 R, 205 R, 206 R, 188/325, 326, 327, 328, 329, 330, 106 R, 340, 341; 280/29, 96.1, 796; 192/115

[56] References Cited

U.S. PATENT DOCUMENTS

| | | | |
|---|---|---|---|
| 2,912,068 | 11/1959 | House | 188/206 R |
| 3,650,360 | 3/1972 | King et al. | 188/330 |
| 4,150,736 | 4/1979 | Marti | 188/18 R |

FOREIGN PATENT DOCUMENTS

| | | | |
|---|---|---|---|
| 1139761 | 11/1962 | Fed. Rep. of Germany | 188/106 R |
| 1575883 | 1/1970 | Fed. Rep. of Germany | 188/206 R |
| 2125486 | 11/1972 | Fed. Rep. of Germany | 188/327 |

Primary Examiner—Douglas C. Butler
Assistant Examiner—R. R. Diefendorf

[57] ABSTRACT

A spider for a brake having dual web brake shoes to be utilized at the wheel end of a heavy duty truck or trailer axle includes a pivoting end support plate mounted at a hole therethrough at a first axial location on the axle to extend radially outwardly therefrom to include at its extended end a pair of pivot pins for the support of each of the webs of each brake shoe. An actuation support plate is mounted at an opening therethrough at a second axial location on the axle which is separated from the first axial location. The extended end of the actuation support plate is capable of supporting a cam actuator which will operate on the opposite ends of the brake shoes from the pivot pins. There are included side plates which extend axially along opposite sides of the axle to secure the pivotal support plate and the actuation support plate to each other.

4 Claims, 8 Drawing Figures

BRAKE SPIDER

This application is a continuation of application Ser. No. 259,262, filed Apr. 30, 1981, now abandoned.

BACKGROUND OF THE INVENTION

1. Field of the Invention

This invention relates to a spider for a drum brake and, more specifically, to such a drum brake which is found in heavy duty truck and trailer axle configurations and includes dual web brake shoes and an actuation means which is supported at a location axially separated from the location for the support of the pivotal ends of the brake shoes.

2. Description of the Prior Act.

It is not uncommon in the heavy duty truck and trailer field to utilize drum brakes which employ a rotary cam actuation means. Typically such brakes include a pair of brake shoes having adjacent ends pivotally mounted on a pair of pivot pins supported by a brake spider which is secured to the axle spindle. A rotatable actuating cam is mounted at the opposite end of the spider and disposed between the other ends of the brake shoes. Rotary movement of the cam causes each of the brake shoes to move outwardly about the pivot pins to contact the inwardly facing friction surface of the brake drum.

For such heavy duty brake installations, the brake shoes are relatively wide and are commonly of the dual web type. Typically, each dual web brake shoe is supported at its pivtal end by structure which is centrally located on the brake shoe and the ends of each pivot pin extend outwardly from opposite sides of the support to be recieved within web bores or recesses in each of the webs. The webs at the other end of each brake shoe support a roller means therebetween which makes rolling contact with the actuating cam and receives the actuation force therefrom. However, the actuating cam cannot be supported at a location between the brake shoe webs, as can the pivot pins, because the rotatable cam is physically positioned in this region. Therefore, the support for the rotary cam actuation means is typically axially separated from a location between the webs and central of the brake shoes. As a result, brake spiders utilized in brakes of this type include support structure which is aligned between the webs of shoes at one end and which is offset to support the rotary cam actuation means at the other end.

U.S. Pat. Nos. 2,167,607; 2,957,706; 3,131,583 and 4,157,747 disclose brake spider configurations of this type and are usually forged to provide a thickened, reinforced structure having sufficient strength to withstand the axially separated forces acting on the spider during braking operation. While brake spiders of this type have been satisfactorily employed for a number of years, it is always desirable to reduce the overall weight of such heavy duty brake installations and to reduce the cost of their manufacture and assembly.

SUMMARY OF THE INVENTION

It is an object of this invention to provide a spider for a brake to be utilized at the wheel end of a heavy duty truck or trailer axle which is relatively light, inexpensive to manufacture and easy to install on the axle.

These and other objects of the invention are provided in a perferred embodiment therof including a spider for a brake to be utilized at the wheel end of a heavy duty truck or trailer axle, wherein the brake includes a drum mounted for rotation with the wheel and a pair of brake shoes including a dual web support structure centrally located thereon. One end of the dual web support structure of each of the brake shoes is supported by pivot pin means and the upper end of the dual web support structure of each of the brake shoes including roller means to be acted upon by a brake actuation means. The brake actuation means is supported at a location axially separated from the central location of a dual web support structure of the brake shoe. The spider includes a pivoting end support plate having an opening at one end thereof for the receipt of the axle therein. The pivoting end support plate is secured to the axle at a first axial location thereon at the opening to extend radially outwardly from the axle. The pivoting end support plate has an extended end thereof for supporting the pivot pin means. An actuation support plate has an opening therethrough at one end thereof and is mounted on the axle at the opening at a second axial location thereon which is separated from the first axial location. The actuation support plate is mounted to extend radially outwardly of the axle to position an extended end thereof at a circumferential location about the axle which is directly opposite the extended end of the pivoting end support plate. The actuation support plate has at its extended end means for supporting the actuation means.

DETAILED DESCRIPTION OF THE INVENTION

Figures 1, 2:
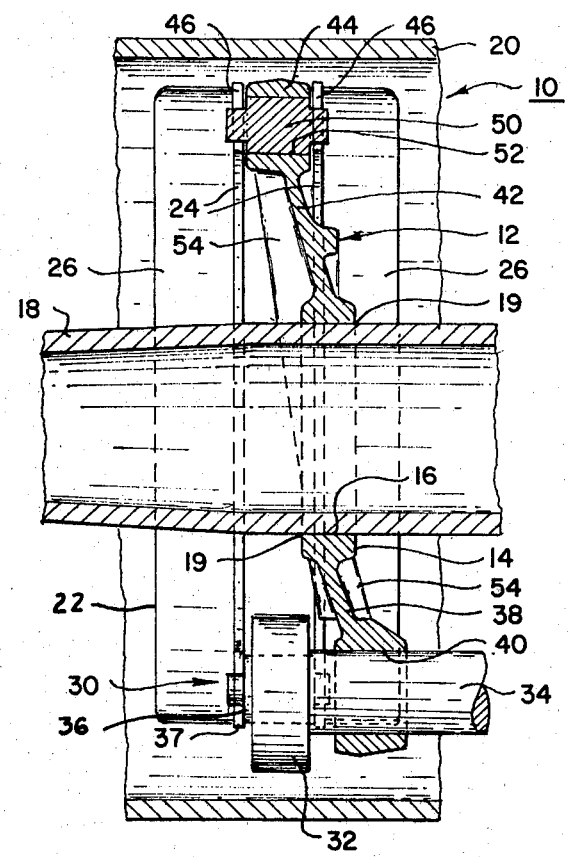
FIG. 1 is a sectional side view of a drum brake including a prior art spider.
FIG. 2 is an end view of the drum brake as shown in FIG. 1 including the prior art spider.
Figure 3:
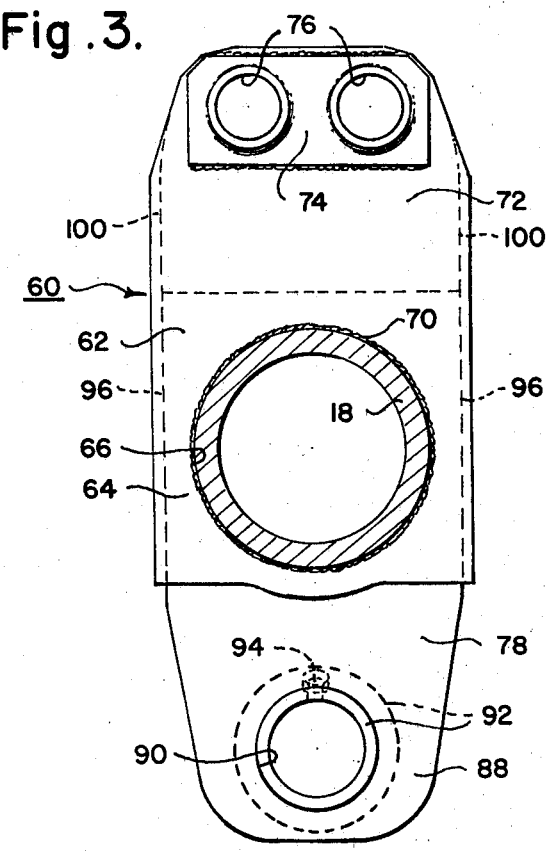
FIG. 3 is an end view of the preferred spider including various features of the invention.
Figure 4:
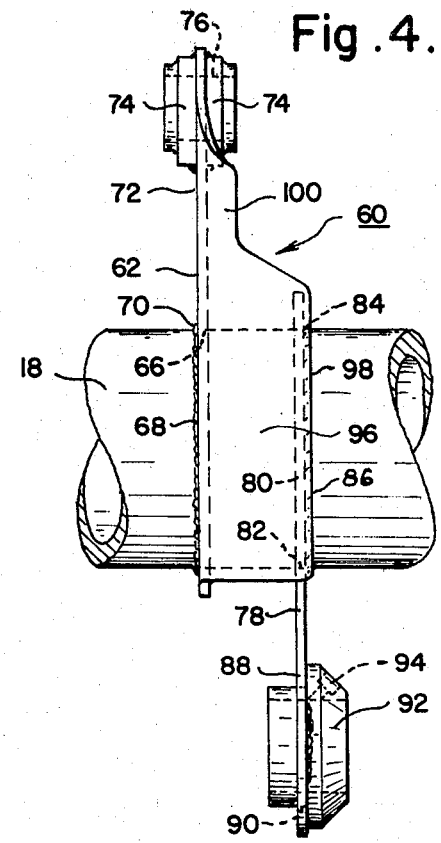
FIG. 4 is a side elevational view of the preferred embodiment as shown in FIG. 3.

As seen in FIGS. 1 and 2, a drum brake assembly 10 includes a prior art brake spider 12 and is typical of the type of brake found in heavy duty trucks and trailers. The spider 12 includes a central portion 14 having an opening 16 therethrough and being mounted on an axle 18 or spindle thereof. The axle 18 extends through the opening 16 as the central portion 14 is welded to the axle 18 at both edges 19 at opposite ends of the opening 16. A brake drum 20 is mounted to a wheel (not shown) which is rotatably mounted on the spindle of the axle 18 in a manner well known in the art.

The brake drum assembly 10 for such heavy duty applications commonly utilizes a pair of brake shoes 22 which are dual web fabricated brake shoes, i.e., each brake shoe 22 includes a pair of axially spaced webs 24 secured to a table 26. The webs 24 are flat in a radial direction and curved in a longitudinal or circumferential direction. The brake shoe table 26 is curved in the circumferential direction and the webs 24 are welded in parallel relationship along the interior curved portion of the table 26 at a central location thereon. This provides a rigid assembly of parts to which the friction lining pad 28 may be secured by rivets or by chemical bonding to complete the formation of shoe 22.

To selectively move the brake shoes 22 outwardly to produce frictional engagement with the interior of the brake drum 20, an actuation means 30 is provided. In the brake assembly 10, the actuation means 30 is in the form of a rotary cam actuator which includes a cam 32 which is rigidly secured to a cam shaft 34. The cam shaft 34 can be rotated by means (not shown) which are well known in the brake art to cause the cam 32 to rotate outwardly displacing the brake shoes 22 for braking engagement with the interior of the drum 20. The brake shoes 22 include rollers or cam followers 36 at the end 37 thereof adjacent the cam 32 to allow smooth application of the force generated by rotation of the cam 32 to each of the brake shoes 22.

first end 38 of the prior art spider 12 includes an opening 40 therethrough for support of the cam shaft 34 as the cam 32 extends from one end thereof to be centrally aligned with the brake shoes 22. The opening 40 may be provided any form of bushing or bearing, including lubrication fittings (not shown), well known in the art to allow free rotation of the cam shaft 34 therein.

The other end 42 of the prior art spider 12 is axially offset from the first end 38 to be aligned with a region between the webs 24 of the brake shoes 22. Specifically, the end 42 of the spider 12 has a radially outward region thereof which includes two bosses 44 having outrwardly facing surfaces which are a predetermined distance apart to be spaced between the parallel webs 24 of each brake shoe 22. In this manner, the bosses 44 properly receive the webs 24 on each side thereof to prevent undesired axial movement of the brake shoes 22 during and after assembly.

An end 46 of the brake shoe 22 is designed to be supported for pivotal movement in response to the outward movement of the end 37 of the brake shoe 22 as it is selectively moved by the cam 32. The end 46 is provided aligned open recesses 48 in the adjacent ends 46 of each web 24. The end 42 of the brake spider 12 includes two circumferentially spaced pivot pins 50 with each being associated with one of the dual web brake shoes 22. The pivot pins 50 are slip fit into holes 52 in the end 42 of spider 12 to extend axially from the bosses 44 at opposite sides of the end 42 of the spider 12 to be capable of receiving the open recesses 48 thereabout for pivotally supporting the dual web brake shoes 22 thereon.

Since it would be possible to provide a different form of pivot pin which is press fit or otherwise rigidly secured in the holes 52, the spider 12 could be utilized with a pair of brake shoes which have matching holes at the pivotal end thereof rather than simple open recesses 48. This different type of pivot pin would be installed in the holes 52 after the brake shoes are positioned adjacent the bosses 44.

On the other hand, since the brake shoes 22 include open recesses 48, it would be possible for the pivot pins 50 to be replaced with integrally formed pivot posts which would extend outwardly from the opposite sides of the spider 12. U.S. patent application Ser. No. 206,940, filed on Nov. Pat. 1980, by Donald E. Steis and David J. Pulliam, entitles "Brake Spider With Integral Pivot Posts", and assigned to the assignee of the present application, discloses such integrally formed posts on a spider.

As thus explained, the prior art spider 12 is capable of supporting the various elements of the brake 10 and has been satisfactorily employed in the heavy duty truck and trailer art. The spider 12 is typically forged of AISI 1040 steel with a yield strength of 42,000 p.s.i. and includes ridges 54 to add to the overall strength of the spider 12. To firmly mount the spider 12 on the axle 18, the opening 16 is closely received about the exterior of the axle 18 and has sufficient axial thickness to add ridigity in this region after the welding at the edges 19. Consequently, when the spider 12 is tested under simulated operating conditions by repeatedly applying large outside forces thereto, the failure of the spider 12 does not occur at the opening 16 but at a region thereon as indicated by the letter R.

In fact, in order to determine the forces created on the spider during an extreme braking condition, a computer study has been run and indicates that the worst case condition exists when the brake is being applied to prevent rotation of the drum in the direction indicated by the arrow D. Under this condition, the forces acting on the spider 12 at the pivot pins 50 would be in a direction as indicated in FIG. 2 by the arrows F1 and F2 and would have a force magnitude of 27,000 pounds and 16,000 pounds respectively. Similarly, at the other end of the spider 12 where the actuation means in the form of the cam actuator 32 is supported, the force would be in a direction as indicated by the arrow F3 and the magnitude would be 14,000 pounds. Since, as mentioned hereinabove, the ends 38 and 42 of the spider 12 are axially offset one from the other, it can be seen that the bending forces created on the spider 12 are significant and that failure to take these bending forces into consideration when designing the spider 12 would easily cause its failure during operation.

In an effort to resolve some of the complications resulting from these bending forces and to provide an overall structure which is easier to manufacture and less expensive than the prior art spider 12, this invention is directed to a preferred spider 60 as shown in FIGS. 3–6. The preferred spider 60 is basically formed of AISI 80X steel plate which is about 0.22 inches thick. AISI 80X steel has a strength of about 80,000 p.s.i. This steel is preferred for a number of reasons which will be explained hereinbelow.

Specifically, the spider 60 includes a pivoting end support plate 62 having an opening in a first end 64 thereof in the form of a circular hole 66. The pivoting end support plate 62 is secured to an axle 18 at a first axial location 68 thereon as the edge 70 of the hole 66 is welded to the axle 18. The pivoting end support plate 62 is oriented to extend radially, outwardly from the axle 18 so that it is perpendicular to the axis of the axle 18.

The pivoting end support plate 62 includes an extended end 72 having means thereon for supporting pivot pins on which the brake shoes can be mounted. Specifically, a pair of stamped and formed reinforcing plates 74 are welded to the end 72 to include a pair of holes into which the pivot pins can be fit in a manner well known in the art and as described hereinabove. Obviously, it would be possible to eliminate the holes through the pivoting end support plate 62 if it were determined to be advantageous to include reinforcing plates which have integrally formed posts thereon in the manner described hereinabove.

An actuation support plate 78 also has an opening therethrough at a first end 80 in the form of a circular hole 82. The actuation support plate 78 is mounted on the axle 18 by the edge of the hole 82 being welded at 84 to the axle 18 at a second axial location 86 thereon which is separated from the first axial location 68. The actuation support plate 78 extends radially, outwardly of the axle 18 to be perpendicular to the axis of the axle 18. An extended end 88 of the actuation support plate 78 is at a circumferential location about the axle 18 which is directly opposite the extended end 72 of the pivoting end support plate 62. A hole 90 in the end 88 receives a powdered metal bushing fitting 92 which is capable of supporting the brake actuation shaft of the type mentioned hereinabove. There may be included in the bushing 92 an opening 94 to provide a means for lubricating the bearing surface.

As thus explained, the preferred spider 60 includes the plates 62 and 78 which are parallel but axially separated by a proper distance for the ends thereof to be aligned with the pivot pins and the bearing support for the actuation shaft in the same offset manner as described hereinabove for the prior art spider 12. However, with the plates 62 and 78 being perpendicular to the axle 18, they are aligned with the forces acting on the pivot pins and the support for the cam actuator so that the plates 62 and 78 are not subjected to the bending moment that existed in the prior art spider 12 where the support for the ends was not directly aligned with the forces acting thereon.

Although the preferred spider 60, as thus described, could satisfactorily support some brake installations, there do exist some problems with the concept of simply providing two plates for a brake spider. Specifically, there would be problems in properly aligning and spacing the plates 62 and 78 during their installation on the axle 18. Therefore, the pivoting end support plate 62 is provided two side plates 96 which are integrally joined at the outer edge thereof and formed perpendicularly thereto to extend along the sides of the axle 18. The extended edges 98 of each side plate 96 are welded to the outer edges of the actuation support plate 78 to provide overall integrity for the spider 60 and insure proper alignment and spacing of the plates 62 and 78. It will be noted that a portion 100 of each plate 96 extends along the edges of the pivoting end support plate 62 to be adjacent its extended end 72. The portions 100 being formed in this manner add needed rigidity to the pivoting end support plate 62 since, as mentioned hereinabove, the resulting forces acting on the pivot pins are greater than the resulting forces acting on the extended end 88 of the actuation support plate 78.

The side plates 96 also provide an additional function of keeping the plates 62 and 78 in proper alignment relative to the axle 18 throughout the welding along the edges 70 and 84 of the holes therethrough. Specifically, as mentioned above, the welding along these outer edges provides a sufficient bonding of the material to support the plates on the axle 18. However, by adding heat to only one side of each plate 62 and 78, the plate would tend to warp during the welding process which could result in a loss of the perpendicular alignment described hereinabove and needed for the proper resolution of the forces acting thereon. Therefore, the side plates 96 facilitate installation and alignment of the plates on the axle 18 and insure that their alignment will be maintained throughout the welding process by providing sufficient resistance to the warping which would otherwise occur.

As thus described, the spider 60 may or may not be lighter than the spider 12 but is definately less expensive to provide than is the prior art spider 12. A complicated forging die to form the spider 12 is obviously more expensive than the simple blanking or forming dies needed to form the plates 62 and 78. However, it is more significant that it would be more expensive to heat and forge the metal to provide a blank spider than it would be to simply stamp and form sheet metal. Another major savings in costs occurs during the manufacturing steps needed to convert the blank spider to a finished product.

Although the holes 16, 40 and 52 in the prior art spider 12 are basically formed during the forging, a machining step is required for properly preparing the surfaces to receive the elements therein. The machining operations significantly add to the overall cost of providing the finished spider 12. The formation of the holes 76, 66, 82 and 90 in the preferred spider 60, on the other hand, is accomplished through a simpler, less expensive punching operation. Only the machining of the holes 76 is required and this is accomplished at the same time the holes in the reinforcing plate 74 are machined. Therefore, some significant machine operations are eliminated by the use of the spider 60 eliminating some of the manufacturing costs required for the prior art spider 12.

Figure 5:
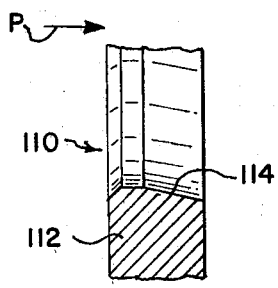
FIG. 5 is an exploded fragmentary view of the edge of an opening in one of the plates of the preferred spider as shown in FIGS. 3 and 4 prior to being installed on the axle.
Figure 6:
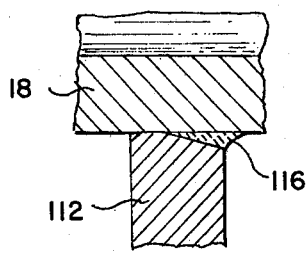
FIG. 6 is an exploded fragmentary view of the edge of one of the plates as shown in FIG. 5 and as installed on the axle.

As seen in FIGS. 5 and 6, the punching operation affects the shape of the edge of the holes formed in the plates utilized to produce the spider 60. When the punching die is moved in the direction as shown by the arrow P, the metal blank tends to tear away from the stationary metal so that the trailing edge of a hole 110 formed in a piece of sheet metal 112 has a beveled surface as indicated at 114. Accordingly, as seen in FIG. 6, when the welding is performed to join the plate 112 to the axle 18, the plate is oriented so that the beveled side is positioned toward the welding machine. As a result, the weld 116, similar to the welds 70 and 84 mentioned hereinabove, will join the plate 112 to the axle 18 with the weld material filling in the area between the outer surface of the axle 18 and the bevel surface 114 to provide overall integrity to the joining of the plate to the axle.

One might ask why a single piece of plate steel couldn't be formed with an off-set like the spider 12 to save the above mentioned manufacturing costs. Besides the obvious problems of supporting such a spider during welding to the axle, the above mentioned bending forces which result from the metal not being aligned with the forces acting on the ends of the spider would destroy the thin, "flat" steel used in the spider 60. To withstand these forces, the basic plate material made of the same steel having a yield strength of about 80,000 p.s.i. would have to be thicker and some reinforcing flanges would have to be formed along the edges to prevent bending. The resulting increase in cost of material and forming prevent this design from being considered as a reasonable alternative in light of the advantages found in the preferred spider 60.

Figure 7:
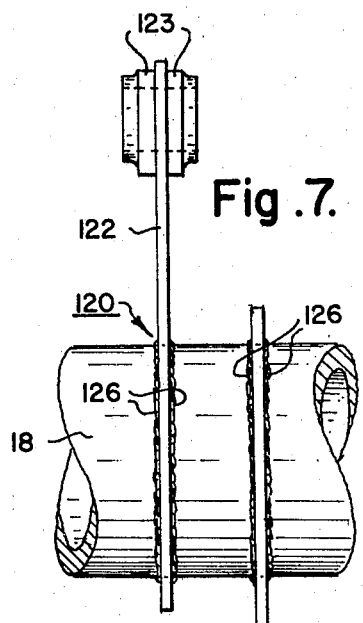
FIG. 7 is a side elevational view of an alternative embodiment of the invention.

While the embodiment shown in FIGS. 3, 4, 5 and 6 represents the preferred embodiment of the invention, it is possible to provide other alternative spiders which could be successfully utilized even though not preferred. As seen in FIG. 7, an alternative spider 120 basically includes two radially extending plate members 122 and 124 which are oriented and axially displaced one from the other in the same manner as are the plates of the spider 60. They would also respectively include reinforcing plates 123 and a bushing 125 in the manner described hereinabove. Although the side plates 96 are eliminated from the alternative spider 120, the plates 122 and 124 can still be provided sufficient strength to respectively support the pivot pins and the actuation means throughout brake operation by increasing the thickness of the plate material. Specifically, it has been found in one embodiment that a thickness of about 0.38 inches would be sufficient.

The elimination of the side plates 96, however, complicates the installation and fabrication of the alternative spider 120. Since the side plates 96 are used to properly space and support the radially extending plates, their elimination requires that some other means be utilized to insure the proper positioning of the plates 122 and 124 during the welding. Additionally, the welding for the alternative embodiment 120 would preferably be along both sides of the plates 122 and 124, as shown at 126, to insure that they are properly secured to the axle 18 without producing the undesired warping mentioned hereinabove. Accordingly, although the spider 120 might be satisfactoriuly employed in some brake installations, it would not include all of the advantages found in the spider 60 and is, therefore, not the preferred.

Figure 8:
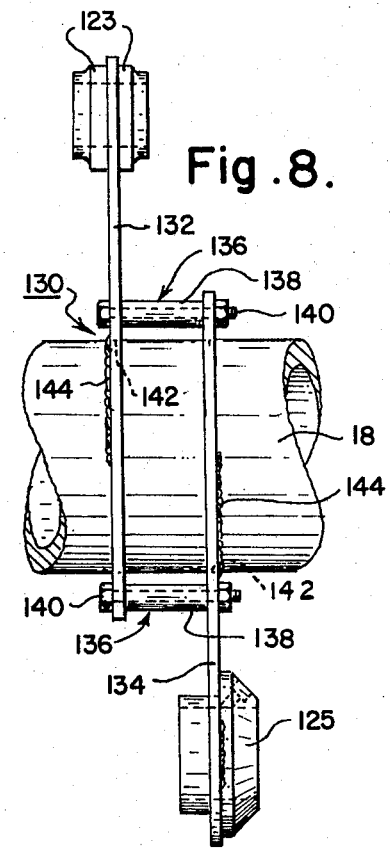
FIG. 8 is a side elevational view of another alternative embodiment of the invention.

Still another alternative embodiment of the invention in the form of spider 130 is shown in FIG. 8. The plates 132 and 134 of the spider 130 are formed of the same material and thickness as are the plates in the alternative spider 120. However, in this embodiment, there is included means for properly spacing the plates 132 and 134 one from the other. For this purpose, there are provided four bolt and tube devices 136 which are circumferentially evenly spaced about the axle 18. Each device 136 includes a tubular member 138 which properly spaces the plates 132 and 134 one from the other and which is aligned with holes through these plates for the receipt of a bolt 140. When the bolts 140 are properly secured at the opposite side of the plates 132 and 134 with the tubes 138 properly positioned and secured therebetween, the overall integrity of the spider 130 is similar to the integrity provided by the side plates 96 of the spider 60. Accordingly, the spider 130 can be properly oriented for securing to the axle 18. However, the spider 130 has an alternative feature of including openings 142 in each plate 132 and 134 which are U-shpaed rather than being circular to completely encircle the axle 18. The U-shaped openings 142 are, therefore, only welded at 180 degrees as indicated at the outside welds 144 since only this portion of the edge of the openings 142 will be brought into contact with the outside surface of the axle 18. Providing the openings 142 with this U-shaped configuration could facilitate installation of the spider 130 on the axle 18 although some means would have to be employed to prevent its tipping over during the welding operation. The use of the openings 142 would not prevent the spider 130 from having sufficient overall integrity for some brake installations. However, if the spider 130 were to be subjected to the same forces as spider 60, the openings 142 would probably not be adequate and circular openings with 360 degrees of welding would be preferred to provide the spider 130 with the same overall integrity as the spider 60.

Although each of the embodiments discussed hereinabove have preferably been formed of steel plate having a yield strength of 80,000 p.s.i., other steel plate could be utilized. For example, steel plate having a yield strength of only 42,000 p.s.i. could be employed but would have to be thicker to be able to withstand the same forces. The thickness of the plates shown in FIGS. 7 and 8 would be about 0.50 inches rather than the 0.38 inches as previously mentioned. Although this steel has been found to be less expensive per pound than the preferred steel, the spider formed with this material would be more expensive since the overall increase in pounds of material required is greater than the cost savings per pound. Obviously, if the relative costs of these different steels were to change, a new evaluation could be made to determine which steel could be most economically employed for each of the embodiments.

It should now be clear from the preferred embodiment shown in FIGS 3–6 and the alternative embodiments shown in FIGS. 7 and 8 that any number of alterations may be made to the spider while still falling within the invention as claimed. It should be noted that the prior art spiders disclosed in the patents mentioned hereinabove and the preferred and alternative embodiments of the invention all utilize a pair of pivot pins for supporting one end of the brake shoes. However, there are some drum brake configurations which employ a single centrally located pivot pin to support both dual web brake shoes. It will be clear to those skilled in the art that if such a configuration also requires the opposite ends of the spider to be axially off-set, one from the other, the present invention could readily be employed for such brakes. Although the specific forces acting on each plate might be different, there is sufficient information provided hereinabove to enable one to design such a spider without departing from the invention as claimed.

I claim:

1. A spider for a brake to be utilized at a cylindrical wheel end portion of a heavy duty truck or trailer axle, said brake including a drum mounted for rotation with a wheel at said wheel end portion and a pair of brake shoes including a dual web support structure centrally located thereon, one end of said dual web support structure of each said brake shoes being supported by pivot pin means and the other end of said dual web support structure of each said brake shoes including means to be acted upon by a brake actuation means, said brake actuation means being supported adjacent said brake shoes at only a single support location axially separated from an axially central location of said dual web support structure of said brake shoes, said spider comprising:

a pivoting end support plate having a first circular opening at one end thereof for closely receiving said axle therein, said pivoting end support plate being welded to said axle at a first axial location thereon at an edge of said first opening toward said wheel to cause said pivoting end support plate to extend radially, outwardly from said axle, said pivoting end support plate having an extended end thereof for supporting said pivot pin means at a central portion thereof aligned with said central location of said dual web support structure of said brake shoes;

an actuation support plate having a second circular opening at one end thereof for closely receiving said axle therein, said actuation support plate being welded to said axle at an edge of said second opening away from said wheel at a second axial location on said axle which is axially separated from said first axial location to cause said actuation support plate to extend radially, outwardly of said axle to position an extended end thereof at a circumferential location about said axle which is directly opposite said extended end of said pivoting end support plate, said actuation support plate having at its said extended end a means for supporting said actuation means at said single support location;

said pivoting end support plate and said actuation support plate respectively lying totally within planes which are perpendicular to said axle and parallel to each other; and a pair of side plates extending axially at each side of said axle adjacent said first and said second openings, said side plates being integrally joined at a base portion thereof to said pivoting end support plate and extending therefrom to be welded to said actuation support plate to add rigidity and support to said pivoting end support plate at said first axial location and said actuation support plate at said second axial location.

2. The spider as set forth in claim 1, wherein said pivoting end support plate, said actuation support plate, and said pair of side plates are formed of identical steel plate material having a predetermined thickness not greater than 0.5 inches.

3. The spider as set forth in claim 1, wherein said base portions of said side plate extend at least partially along said extended end of said pivot support plate to provide additional strength adjacent said extended end thereof for supporting said pivot pin means.

4. The spider as set forth in claim 1, wherein said edge of said first opening of said pivoting end support plate toward said wheel and said edge of said second opening of said actuation support plate away from said wheel are beveled for receipt of weld material therein.

* * * * *